United States Patent [19] [11] 4,271,026
Chen et al. [45] Jun. 2, 1981

[54] CONTROL OF ACTIVATED SLUDGE WASTEWATER TREATING PROCESS FOR ENHANCED PHOSPHOROUS REMOVAL

[75] Inventors: Michael S. Chen, Macungie; Eugene J. Greskovich; Marshall L. Spector, both of Allentown, all of Pa.

[73] Assignee: Air Products and Chemicals, Inc., Allentown, Pa.

[21] Appl. No.: 83,196

[22] Filed: Oct. 9, 1979

[51] Int. Cl.³ ............................................. C02F 3/30
[52] U.S. Cl. ................................. 210/605; 210/614; 210/903; 210/906
[58] Field of Search ............... 210/DIG. 28, DIG. 29, 210/605, 614, 623, 626, 630, 631, 903, 906

[56] References Cited

U.S. PATENT DOCUMENTS

| 4,056,465 | 11/1977 | Spector | 210/DIG. 28 |
| 4,162,153 | 7/1979 | Spector | 210/DIG. 28 |
| 4,173,531 | 11/1979 | Matsch et al. | 210/DIG. 29 |
| 4,183,808 | 1/1980 | Drnevich | 210/DIG. 29 |

Primary Examiner—Thomas G. Wyse
Attorney, Agent, or Firm—Thomas G. Ryder; James C. Simmons; E. Eugene Innis

[57] ABSTRACT

An improved method of operating an activated biomass process wherein influent and activated biomass are initially contacted under anaerobic conditions to form a mixed liquor, the mixed liquor is subsequently oxygenated, thereafter activated biomass is separated from the mixed liquor and at least a portion of the separated biomass is introduced into the initial contacting step. The improved method comprises maintaining both the F/M ratio and the BOD/P ratio within particular ranges, preferably relative to each other.

26 Claims, 4 Drawing Figures

CONTROL OF ACTIVATED SLUDGE WASTEWATER TREATING PROCESS FOR ENHANCED PHOSPHOROUS REMOVAL

BACKGROUND OF THE INVENTION

This invention relates to an improvement in a particular type of activated biomass process wherein the operating conditions of the system are controlled so as to maintain or to exceed a minimal phosphate removal rate, thus enhancing phosphorus removal from influent and simultaneously enhancing phosphorus uptake by biomass. The particular type of biomass process to which the present invention is applicable is one wherein a phosphate- and BOD-containing influent is mixed with recycled activated biomass in the initial contact step of the process, thereby producing a mixed liquor. This initial treating must be under anaerobic conditions, i.e., substantially free of oxygen and oxidizing agents and having a dissolved oxygen concentration of less than about 0.7 ppm. The biomass process further requires the subsequent treatment of the mixed liquor under oxic conditions thereby oxidizing BOD (Biological Oxygen Demand) in the mixed liquor and also causing storage of phosphates in the microorganisms. Subsequent to the oxic treatment, the mixed liquor is subjected to settling or separation whereby a purified supernatant liquid is separated from biomass, at least a portion of which settled biomass is returned to the initial contacting to provide the activated biomass admixed with the influent. The improvement of the present process is obtained by maintaining operating conditions in a biomass process of the type just described so as to enhance removal of phosphorus from the influent and incorporation thereof in the biomass in a high rate system.

Illustrative of the activated biomass process to which the present invention is applicable are those described by Marshall L. Spector in U.S. Pat. No. 4,056,465 entitled "Production of Nonbulking Activated Sludge", and in U.S. Pat. No. 4,162,153 entitled "High Nitrogen and Phosphorous Content Biomass Produced by Treatment of a BOD-Containing Material." In the first patent there is described a process wherein the mixed liquor is initially formed in an anaerobic zone, and such mixed liquor is passed to an oxic zone where it is subjected to oxidizing treatment, and the oxidized mixed liquor is subsequently passed to a settling zone from whence a portion of the activated biomass is recycled to the initial anaerobic zone. This patent also describes another variation of the basic type process wherein the mixed liquor is passed from the anaerobic zone to an anoxic zone (i.e. containing $NO_{x-}$, but substantially no dissolved oxygen) positioned intermediate the anaerobic and oxic zones. In such variant there is also an internal recycle of mixed liquor from the oxic zone back to the anoxic zone, thus providing the $NO_x^-$ in the anoxic zone. It is also disclosed in this patent that such process is effective to remove phosphorus from the influent and to cause the incorporation or storage of the phosphorus in the biomass.

This phenomenon wherein phosphorus is removed from influent and incorporated into biomass has been recognized by various people working in the area of wastewater treatment (see, for example, the references of record in the above mentioned patent).

The difficulties with which the art has been confronted in the past have included the phenomenon that the removal of phosphorus from the influent in the traditional oxygenating systems has not always been consistent, i.e. sometimes it worked, and sometimes it did not work. In other wastewater treating processes where the primary thrust has been the removal of nitrogen compounds from the influent, again phosphorus removal was not consistent, and it was even believed that phosphorus removal was directly related to nitrogen removal. Additionally, in all of these prior art processes, the period of treating required has always been quite extensive ranging upwards of 15 to 20 hours or more. In the processes of the type to which the present invention relates, such as those described in the above-mentioned Spector patent, while phosphorus removal from the influent was always present, the extent or rate of phosphorus removal varied significantly, and there was no means provided for controlling such process to insure enhanced phosphorus removal, high rate processing and a basis for optimizing design of the system.

SUMMARY OF THE INVENTION

It has now been found that enhanced phosphorus removal and operation of an adequately high rate process can be accomplished by maintaining a particular set of interrelated operating conditions within a specific envelope in a particular type of activated biomass process. The process to which the present improvement is applicable requires producing a mixed liquor by initially mixing recycled activated biomass with a phosphate- and BOD-containing influent under anaerobic conditions, i.e. substantially free of oxygen and oxidizing agents and containing a concentration of less than 0.7 ppm dissolved oxygen. This initial contacting of influent and activated biomass effects the selective production of nonfilamentous microorganisms capable of sorbing BOD both under anaerobic conditions and under oxidizing conditions and capable of storing phosphorous-containing materials, hereinafter referred to as phosphates, under oxidizing conditions. Subsequently, the mixed liquor is treated in an oxic or oxygenating step by contacting with oxygen-containing gas so as to maintain a dissolved oxygen (DO) content of at least about one part per million (1 ppm). Treatment under oxic conditions is effective to oxidize BOD in the mixed liquor and to cause storage of phosphates in the biomass. Finally, this mixed liquor which has been previously subjected to anaerobic treatment and then to oxic treatment, is subjected to separation, such as by settling, whereby supernatant liquid is separated from biomass, and at least a portion of the separated biomass is returned to an initial contacting step to provide the activated biomass admixed with the influent.

The improvement of the present invention comprises maintaining within the process system a particular set of interrelated operating conditions within a specific envelope described herein. The process system includes the portion of the processing scheme encompassing the initial anaerobic contacting and extending through all of the processing steps and/or zones of the process up to, but not including, the settling zone or step. The process system also encompasses any internal recycle streams such as, for example, the internal recycle of mixed liquor from an oxic zone to an anoxic zone of the Spector process described above as well as the sludge recycle stream from the separation or settling operation. The particular conditions which must be maintained within the process system include a ratio of influent soluble BOD$_5$, exclusive of BOD due to ammonia, (expressed as milligrams of soluble BOD per liter of influent) to influent soluble phosphate expressed as phosphorous (P) in the aqueous phase (expressed as milligrams of phosphorous per liter of influent) in a ratio (BOD/P) of from about 5:1 up to about 50:1. Additionally, it is necessary to maintain a food to biomass (F/M) ratio from a minimum of about 0.09 up to a maximum of about 1.4. In the above ratio, F is the total mass of soluble BOD$_5$, exclusive of ammoniacal BOD, introduced into the process system per 24-hour day, expressed as milligrams per day, while M is the total weight of volatile suspended solids (VSS) in the process system, expressed in milligrams. Normally, the F/M ratio will be no greater than about 1.0.

In one aspect, namely in the establishment of a minimum F/M value at one end of the envelope (the lower end), the discovery upon which this invention is based is somewhat surprising in that it appears to run contrary to the general consensus in the industry. Thus, for example, those wastewater treating processes wherein phosphorus removal has been noted are of a type which can be termed "low rate systems". When dealing with systems of this latter type, the consensus of the industry appeared to be that the means of accomplishing increased phosphorus removal is to increase the detention time in the system, thereby (the theory went) increasing the time in which the biological process had an opportunity to work. As opposed to this, the present invention is based upon the fact that when operating an activated biomass system of the particular type defined, the rate of phosphorus removal can be increased, and thus the overall phosphorus removal enhanced, by decreasing the detention time. To express this in another manner, the art has generally taken the position that if treatment of a phosphorus containing influent was effective to remove some of the phosphorus, then the way in which to remove more of the phosphorus was to increase the length of exposure of material being treated to biomass doing the treatment. Diametrically opposed to this is the present process wherein the rate of phosphorus removal is increased by decreasing the exposure time of phosphorus containing influent to the particular biomass developed in the system. Through this increased rate of phosphorus removal, it thus becomes possible to enhance the total phosphorus removal.

The means employed herein to define this enhanced area of operation is to select and operate within the proper ratios of F/M and BOD/P. In defining the F/M ratio it will be understood that, at a given concentration of VSS, the longer the detention time of the system, the greater will be the total biomass or total volatile suspended solids. Thus, for a given concentration of BOD in the influent and at a given influent flow rate, the effect of a longer detention time will be to lower the F/M ratio. The present process requires the employment of a minimum F/M ratio of about 0.09; thus, in effect, providing a given system with a limited maximum detention time. Usually, however, the minimum F/M ratio will be at least about 0.10 or even about 0.11. Preferably the F/M ratio selected will be at least about 0.12 and more preferably at least about 0.13.

On the other hand, however, this phenomenon which has been discovered does not continue indefinitely, but rather there are upper limits of the F/M ratio or lower limits to the detention time to be employed at the other end (the higher end) of the envelope for a given system. In this connection, it has been discovered that the upper limit of the F/M ratio to be employed in this process is to be maintained at less than about 1.4 and generally will be less than about 1.0. Preferably, the F/M ratio is maintained at less than about 0.75 or even 0.60. Furthermore, it has been found that the F/M ratio to be employed in a particular system is related to the ratio of soluble BOD$_5$ to the soluble phosphate, expressed as elemental phosphorous (P) in the influent wastewater, i.e. the BOD/P ratio. Thus, with respect to enhanced rate of P removal, the maximum F/M to be employed is about 0.6 and preferably is about 0.3, when the BOD/P ratio is in the range from about 5 to about 10; when the BOD/P ratio is in the range from about 10 to about 20, then the maximum F/M ratio can be about 1.0 and preferably is about 0.45; and when the BOD/P ratio is in the range from about 20 to about 50, then the maximum F/M ratio to be employed is about 1.4 and preferably about 0.5. With respect to enhanced P removal it is less advantageous to employ an F/M ratio greater than about 1.0 regardless of BOD/P.

In the operation of the improved process of this invention, the BOD/P ratio is to be at least about 5:1, as mentioned above. Preferrably, the BOD/P ratio is at least about 6:1 or even about 8:1 with ratios of at least about 10:1 being quite satisfactory.

At the high end of the F/M spectrum the improved process of our invention is advantageous when employed with BOD/P ratios of up to about 50:1 and, although operable with higher ratios, the process is less advantageous. This is merely due to the practical consideration that in most influents, such as municipal sewage, this is the ratio at which phosphate is largely removed from conventional systems because "ordinary" biomass, i.e. containing from 1 to 2% phosphate, expressed as P, can remove most or all of the P, when the soluble BOD$_5$/P ratio is greater than 50:1. The improved results achievable with the present process are more noticeable when the BOD/P ratio is less than about 50:1 and even more so at BOD/P ratios of less than about 30:1 and even less than about 25:1.

The improved results obtained in accordance with this invention are manifested in high rates of phosphorous removal. This high rate is characterized by a first order reaction rate constant ($k_1$) of at least about 0.5, which is maintained until the concentration of P in the aqueous portion of the mixed liquor is reduced to less than about 1 mg/l. With proper selection of operating parameters, $k_1$ values of greater than 0.75 and even greater than 1.0 can be achieved. The term $k_1$ is defined as milligrams of phosphorous removed per hour per milligram of phosphorous in the aqueous portion of the mixed liquor per gram of volatile suspended solids per liter in the oxic zone. Expressed in mathmatical form then $$k_1 = (1/VSS)(-d[\ln P]/dt)$$

where P is soluble phosphate expressed as milligrams of phosphorous per liter, t is nominal residence time in the oxic zone expressed in hours and VSS is expressed in grams per liter.

While, as mentioned above, the improved process of this invention is operable when employing an F/M ratio of at least about 0.09, it is preferred to use an F/M ratio of at least about 0.10 or even 0.11. It should also be noted that when the influent also contains ammonia values, which are oxidized to nitrate and/or nitrite ($NO_x^-$), in addition to BOD and phosphorus and at least a portion of the oxygenated mixed liquor is to be subjected to denitrification by BOD under anoxic conditions, it is preferred to employ slightly higher F/M ratios than would otherwise be employed. Accordingly, then, in such embodiment, it is preferred that the F/M ratio be at least about 0.10 and preferably at least about 0.11. F/M ratios of at least about 0.12 and even 0.14 are particularly preferred when this mode of the basic process is employed. The reason for this higher minimal F/M ratio is to ensure that there is an adequate supply of $BOD_5$ to compensate for that utilized in denitrification. It is also preferred to use an F/M ratio no greater than about 0.75.

With respect to systems which must perform a nitrifying function it is also preferred that the F/M ratio employed will be less than about 0.75 and preferably will be less than 0.6.

As will be understood, the BOD content and the phosphorus content of the potential influent are not always that which might be desired by the operator and, accordingly, the introduction of a particular influent to a unit of fixed size, particularly an existing prior art unit, will not always, if ever, produce the BOD/P or F/M ratios and the interrelationship thereof as if required by the present process. Various techniques are available, however, in order to make the required adjustments. One is a substantial reduction in the overall size of the unit being employed. For units being constructed for the purpose of practicing this improved process, the number and size of the basins can be reduced drastically. Thus, for example, traditional units designed for the biological removal of BOD have been sized so as to permit detention times on the order of from 15 to 20 hours up to several days. As distinguished from this, a unit constructed specifically to practice the improved process of this invention would be sized so as to provide a detention time of less than about 10 hours, preferably less than about $7\frac{1}{2}$ hours with detention times of about 5 hours or less, such as $3\frac{1}{2}$ or even 2 hours, being quite feasible. For existing units, a solution would be to bypass a substantial volume of the existing basin capacity. Alternatively, aeration can be eliminated in a portion of an oxic zone, thus, in effect, reducing the active volume under oxic treatment.

Even with a newly constructed unit which has been designed specifically for the practice of this improved process, it may be necessary from time to time to make lesser adjustments in the operating conditions in the plant. This is particularly so in a wastewater treating plant when the BOD and phosphorus content, as well as the concentrations thereof, can vary noticeably from one time of day to another, as well as from one season of the year to another. These less than gross changes in operating conditions can be affected by lesser modifications and adjustments. Thus, for example, the BOD/P ratio can be adjusted in several ways. If it is desired to increase the BOD/P ratio, this can be done by the addition of further BOD to the system. For example, by addition of extraneous BOD such as sugar, brewery waste or molasses. Similarly, the BOD/P ratio in the system can be increased by removing phosphorus from the system by treatment with chemicals such as salts of aluminum (alum) or iron or physical chemical methods as described in EPA Manual "Process Design Manual for Phosphorous Removal", October 1971. In this connection, it should be noted that the use of lime for phosphorus removal, while being operable, is not preferred.

Conversely, the BOD/P ratio can be reduced by the addition of sources of phosphorus such as phosphate rock which is at least partially solubilized within the system. While this may appear to run contrary to the general teachings of the art and the goals of the treating process, the present improved process is quite capable of efficiently removing both large quantities and high percentages of phosphorus from the influent so that the addition of phosphorus to the system is not only an acceptable procedure, but, in fact, may be desirable and advantageous inasmuch as it produces a relatively high phosphorus content sludge which can be of value in and of itself as explained more fully in the above-mentioned U.S. Pat. No. 4,162,153 of Spector.

The F/M ratio in the system can also be adjusted through various techniques. Thus, if the F/M ratio is less than required in this improved process, it can be increased by the addition of BOD, such as sugar, to the process. It will be understood, that this also increases the BOD/P ratio. Another technique for increasing the F/M ratio is to take steps to decrease the value of M, for example by decreasing the sludge recycle rate. Still another technique for increasing the F/M ratio is merely to increase the influent flow rate. While with other processes the increase of the influent flow rate might generally be undesirable, such is not necessarily the case at the low F/M range of the present process since an increase in influent flow at a given BOD level results in higher F/M, lower detention time and increased rate of phosphorus removal. On the other hand, however, if it is desired to decrease the F/M ratio, an acceptable technique is to increase the value of M or the value of the volatile suspended solids in the system by increasing the sludge recycle rate relative to influent rate, decreasing sludge purge from the system or a combination of both.

It will be understood that while each of these individual techniques can be used separately to alter F/M ratios and BOD/P ratios, it is also possible to use various techniques in combination. Thus, for example, increasing influent flow rate while decreasing sludge recycle rate will have a more significant effect on increasing the F/M ratio but will not necessarily alter the BOD/P ratio. As mentioned above, the further employment of the technique of adding BOD to the system will not only further increase the F/M ratio, but will also increase the BOD/P ratio.

When operating in accordance with the improved procedure described above wherein the F/M and BOD/P ratios are controlled within certain ranges and relative to each other, it is also desirable to control the influent Detention Time (IDT) of the anaerobic, oxic, and anoxic treatments. Particularly, it is desirable to control the IDT's of the anaerobic and oxic treatments relative to each other.

Generally, it is desirable to control the IDT of the anaerobic treatment such that it represents at least about 5% of the total IDT of the entire process system. Usually, the IDT of the anaerobic treatment represents at least 10% or even 20% of the total IDT of the process system. On the other hand, the IDT of the anaerobic treatment is usually controlled such that it constitutes no more than about 80% of the total IDT of the process system. Typically, the IDT of the anaerobic treatment is no more than about 70% or even about 60% of the total IDT of the process system.

The IDT of the oxic treatment for typical operations is controlled so that it comprises at least 20% of the total IDT of the process system. Controlling the oxic IDT so as to constitute at least about 30% or even about 40% of the total IDT of the process system is quite satisfactory. Normally, the IDT of the oxic treatment is controlled such that it represents less than about 95% of the total IDT of the process system and, generally, is controlled so as to constitute less than about 90% or even less than about 80% of the total IDT of the process system.

When operating with a system wherein the influent also contains ammonia values and such components are subjected to nitrification and denitrification under anoxic conditions, the IDT of the anoxic treatment is controlled so as to comprise at least about 5% and usually at least about 10% of the total IDT of the process system. Conversely, the IDT of the anoxic treatment is controlled so that it comprises no more than about 50% of the total IDT of the process system. Typically, the IDT of the anoxic treatment is controlled so that it constitutes less than about 30% or even less than about 20% of the total IDT of the process system.

Another way of expressing the limits regarding the control of IDT's during the anaerobic and oxic treatments is to maintain control of the anaerobic and oxic treatment IDT's based upon the total IDT for only the anaerobic and oxic treatments, even if there are additional treatments in the process, such as, for example anoxic treatment. When expressed in this manner, the IDT of the anaerobic treatment is to be at least 10% of the combined anaerobic and oxic IDT's while the IDT of the anaerobic zone should be controlled so as to be no greater than about 70% or even about 60% of the combined anaerobic and oxic IDT's. Conversely, the IDT in the oxic treatment is to be controlled such that it comprises no more than 90% of the combined anaerobic and oxic IDT's. On the other hand, the IDT of the oxic treatment is to be controlled so as to comprise at least about 30% or even about 40% of the combined anaerobic and oxic IDT's.

This invention also allows of the conduct of biological processes, such as, for example, fermentation, including the production of biosynthetic medicaments, in a controlled manner so as to obtain rapid incorporation of phosphorous into the active biomass. The result of this is, of course, the maintenance of a biological population of high phosphorous content providing the advantages of ready separation of the more dense biomass from the liquor containing the product. Further, the resulting high phosphorous content biomass contains its own internal source of energy, which permits the valuable biomass to survive anaerobic conditions or to stand up to oxygen deficiencies in the system.

In the attached drawing the Figures are schematic representations of two differing "type" processes in which the present invention can be utilized.

Figure 1:
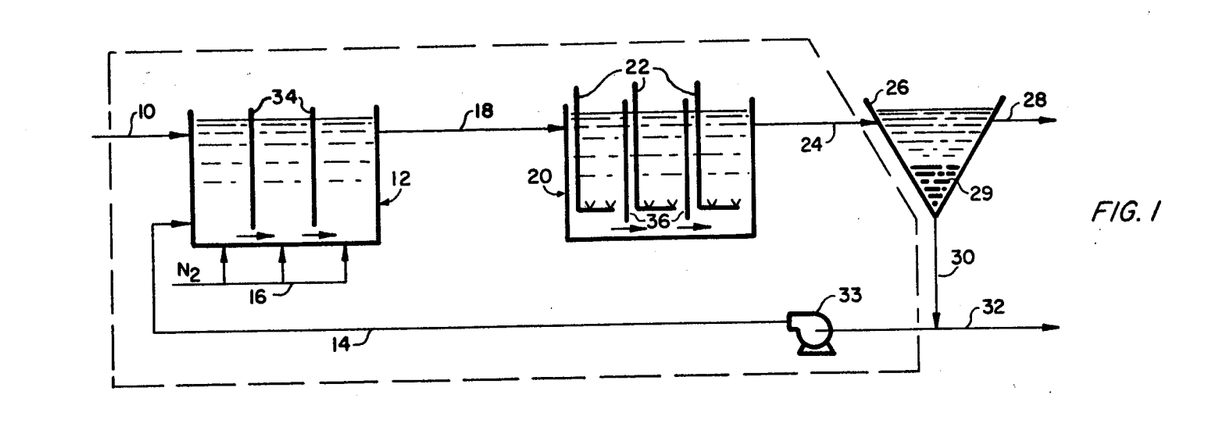
FIG. 1 represents a simplified diagram illustrating the basic type process to which this invention relates.

Referring now to FIG. 1, an activated biomass system is illustrated having an inlet line 10 for the introduction of a BOD- and phosphorus-containing influent. Typically, the influent can be wastewater from a primary sedimentation tank in a sewage treatment operation. Alternatively, the influent could be a BOD- and phosphorus-containing charge stock to a fermentation process. The influent initially enters an anaerobic mixing zone 12 wherein it is admixed with activated biomass introduced into mixing zone 12 by means of sludge recycle line 14 in order to form a mixed liquor. The anaerobic conditions defined above can be maintained, for example, by blanketing the liquid surface in zone 12 with nitrogen or other inert gas or by providing a cover to zone 12. Another means for insuring the maintenance of anaerobic conditions in zone 12 is to bubble nitrogen through the liquid in order to strip any oxygen therefrom. This particular technique is illustrated by means of manifolded nitrogen inlet line 16 shown in FIG. 1 as introducing nitrogen into the bottom of zone 12.

The mixed liquor formed in anerobic mixing zone 12 is then passed by means of line 18 into oxic treating zone 20 wherein the mixed liquor is contacted with an oxygen-containing gas. In FIG. 1 this is illustrated by means of spargers 22 designed to permit the contacting of mixed liquor with an oxygen-containing gas such as air, oxygen, or oxygen enriched air.

Subsequent to the oxic treatment, the mixed liquor from oxic treating zone 20 is passed by means of line 24 into clarifier 26 wherein the mixed liquor is permitted to separate into a supernatant liquid phase and a more dense activated biomass phase. The supernatant liquid is removed from clarifier 26 by means of line 28 and then can be sterilized via ozone, chlorine or chlorine dioxide contacting and discharged to receiving waters, when the process is an activated sludge sewage treatment process. Alternatively, when the treatment is, for example, a fermentation process, the liquid of line 28 can be recovered as the product-containing stream.

The dense activated biomass layer 29 is maintained at a desired level by controlled removal from clarifier 26 by means of line 30. A portion of this activated biomass is removed from the system by line 32, while another portion of the activated biomass is recycled to the anaerobic mixing zone 12 by means of pump 33 and line 14.

While anaerobic mixing zone 12 can be a single treating stage, it is preferred to divide the anaerobic zone into a plurality of separate hydraulic stages. As illustrated in FIG. 1, this can be accomplished through the use of partitions 34 which divide anaerobic zoning 12 into three interconnected stages. It will also be understood, of course, that zone 12 can be divided into a greater or lesser number of stages.

Similarly, it is also preferred to have the oxic treating zone 20 divided into a plurality of interconnected hydraulic stages. This is illustrated in FIG. 1 by means of the two partitions 36 which divide zone 20 into three stages. Again, it will be understood that zone 20 can also be divided into a greater or lesser number of stages.

In practice, a process of the type illustrated by FIG. 1 operates to effect incorporation of large quantities of phosphorus into the activate biomass, while causing the elimination of BOD from the liquid portion of the material treated; thereby providing a liquid effluent in line 28 of substantially reduced BOD and P content while providing an activated biomass, such as that removed from the clarifier by means of line 30, having a relatively high phosphorus content. The process system shown in FIG. 1 to which the parameters of this invention relate is that portion of the flow scheme of FIG. 1 enclosed within the dashed lines.

Figure 2:
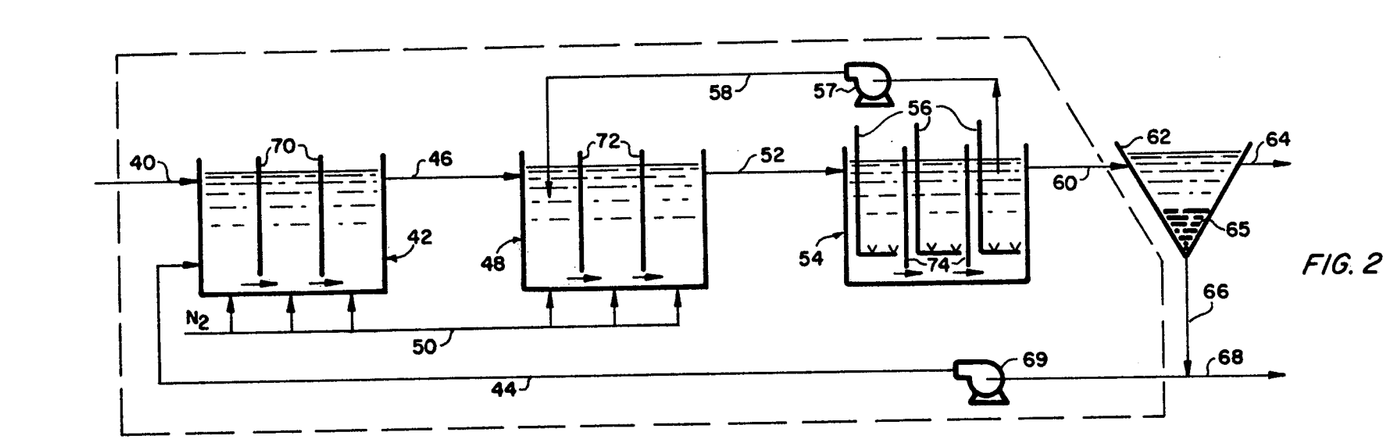
FIG. 2 is a diagrammatic representation of another type system in which nitrification and denitrification are practiced.

Referring now to FIG. 2, an activated biomass system having nitrification and denitrification capabilities is illustrated. This system has an inlet line 40 for the introduction of a BOD-, phosphorus-, and ammonia-containing influent. The influent is most typically a municipal or industrial wastewater stream. Alternatively, the influent can be the charge stock to a biosynthetic process, e.g. fermentation. The influent of line 40 initially enters an anaerobic mixing zone 42 wherein it is admixed with activated biomass introduced into mixing zone 42 by means of sludge recycle pump 69 and line 44 in order to form a mixed liquor.

The mixed liquor formed in anerobic mixing zone 42 is then passed by means of line 46 into anoxic treating zone 48 wherein the mixed liquor, containing BOD, is treated in the substantial absence of dissolved oxygen in order to convert nitrites and/or nitrates ($NO_x^-$) into gaseous form, primarily $N_2$, which is then removed from the system by bubbling off.

The techniques for insuring the absence of dissolved oxygen in both anaerobic mixing zone 42 and anoxic treating zone 48 can be the same as those discussed above in connection with the description of FIG. 1. Again, as in FIG. 1, the technique illustrated is the bubbling of nitrogen through the mixed liquor in order to strip oxygen therefrom. This particular technique is illustrated by means of manifolded nitrogen inlet line 50 shown in FIG. 2 as introducing nitrogen into the bottoms of both zone 42 and zone 48.

Subsequent to the anoxic treatment in zone 48, the mixed liquor therefrom is passed by merans of line 52 into oxic treating zone 54. The mixed liquor introduced into oxic treating zone 54 still contains P, BOD, ammonia and ammoniacal compounds, which latter two materials pass through anaerobic mixing zone 42 and anoxic treating zone 48 substantially unaffected. In oxic treating zone 54 this mixed liquor is contacted with an oxygen-containing gas. In FIG. 2 this is illustrated by means of spargers 56 designed to permit the contacting of mixed liquor with an oxygen-containing gas such as air, oxygen, or oxygen enriched air. Among other things, this treating of the mixed liquor with oxygen is effective to convert ammonia and ammoniacal compounds into nitrites and/or nitrates. A portion of the mixed liquor containing these nitrites and nitrates is internally recycled from oxic treating zone 54 to anoxic treating zone 48 by means of pump 57 and internal recycle line 58. The material internally recycled by means of pump 57 and line 58 is the source of $NO_x^-$ subjected to the anoxic treatment in zone 48 as described previously.

Subsequent to the oxic treatment in zone 54, the mixed liquor therefrom is passed by means of line 60 into clarifier 62 wherein the mixed liquor is permitted to separate into a supernatant liquid phase and a more dense layer 65 of activated biomass. The supernatant liquid is removed from clarifier 62 by means of line 64. This liquid can, if required, be sterilized and discharged to a stream or river in the form of purified water, when the process is an activated sludge sewage treatment process.

The more dense layer 65 of activated biomass is maintained at a desired lever by controlled removal from clarifier 62 by means of line 66. A portion of this activated biomass is removed from the system by line 68, while another portion of the activated biomass is recycled to the anerobic mixing zone 42 by means of sludge recycle pump 69 and line 44.

While the anaerobic mixing zone 42, the anoxic treating zone 48 and the oxic treating zone 54 can each be a single treating stage, it is preferred to divide each of these stages into a plurality of interconnected hydraulic stages. As illustrated in FIG. 2 this can be accomplished through the use of partitions and two each of partitions 70, 72 and 74 are shown dividing anaerobic mixing zone 42, anoxic treating zone 48 and oxic treating zone 54, respectively, each into three separate stages. It will be understood, of course, that each of the zones can be divided into a greater or lesser number of individual stages and that it is not necessary for each of the zones to be divided into the same number of stages.

The process system shown in FIG. 2 to which the parameters of this invention relate is that portion of the flow scheme enclosed within the dashed lines.

Figure 3:
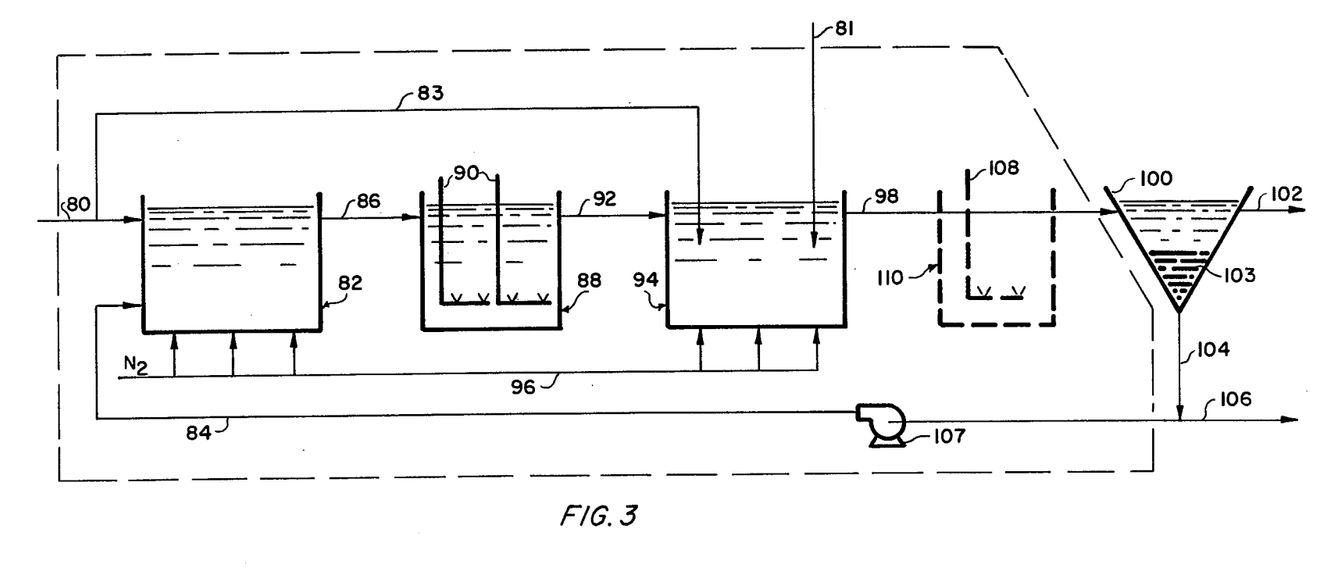
FIG. 3 is a simplified diagram illustrating an alternative flow scheme for a nitrification-denitrification system.

Referring now to FIG. 3, there can be seen a diagram of an activated biomass system having nitrification-denitrification capabilities and having a flow scheme which is an alternative to that ilustrated in FIG. 2. This system has an inlet line 80 for the introduction of a BOD-, phosphorous-, and ammonia-containing influent into an anaerobic mixing zone 82 wherein it is admixed with activated biomass introduced into mixing zone 82 by means of sludge recycle line 84 in order to form a mixed liquor.

The mixed liquor formed in anaerobic mixing zone 82 is then passed by means of line 86 into oxic treating zone 88. The mixed liquor introduced into zone 88 still contains BOD as well as P, ammonia and ammoniacal compounds, which latter two materials pass through anaerobic mixing zone 82 substantially unaffected. In oxic treating zone 88, this mixed liquor is contacted with an oxygen-containing gas. As in the preceding figures, this is illustrated by means of spargers 90 designed to permit the contacting of mixed liquor with an oxygen-containing gas such as air, oxygen or oxygen-enriched air in order to effect P and BOD removal. The previously unaffected ammonia and ammoniacal compounds in the mixed liquor are converted also into nitrites and/or nitrates ($NO_X^-$) and this $NO_X^-$ containing mixed liquor is then passed from an oxic treating zone 88 by means of line 92 and introduced into anoxic treating zone 94 wherein $NO_x^-$ is reduced largely to elemental nitrogen by oxygen demand of the biomass in the mixed liquor. In the event that additional BOD is required for more complete denitrification, BOD from external sources can be added to anoxic treating zone 94 by means of supplemental food line 81, influent by-pass line 83 or a combination of both.

While various techniques can be employed to insure the low dissolved oxygen content required for anaerobic and anoxic conditions, the technique illustrated in this figure is the employment of a manifolded nitrogen inlet line 96 designed to introduce nitrogen into the bottoms of zones 82 and 94. As discussed previously, this technique of bubbling nitrogen through the mixed liquor is effective to strip oxygen therefrom. The anoxic treatment of the mixed liquor is effective to convert the $NO_X^-$ compounds into gaseous form, primarily $N_2$, which can then be removed from the system by bubbling off.

Mixed liquor is then removed from anoxic treating zone 94 by means of line 98 and this nitrified-denitrified and BOD reduced mixed liquor is introduced into clarifier 100 wherein the mixed liquor is permitted to separate into a supernatant liquor phase and a layer 103 of more dense activated biomass. The supernatant liquid is removed from clarifier 100 by means of line 102 for disposition or further processing. The more dense activated biomass is maintained at a desired level by controlled removal from clarifier 100 by means of line 104. A portion of this activated biomass is removed from the system by means of line 106, while another portion of the activated biomass is recycled to the anaerobic mixing zone 82 by means of recycle pump 107 and line 84.

Also shown in dotted lines in FIG. 3 is an additional and optional oxic treatment zone 110 having a sparger 108. This optional oxic treatment zone 110 is shown as being located between anoxic treating zone 94 and clarifier 100. This optional treating zone can be employed if it is desired to increase the dissolved oxygen content of the mixed liquor before introducing it into the clarifier 100.

The portion of the system shown in FIG. 3 to which the parameters of this invention relates is enclosed with a dashed line.

Figure 4:
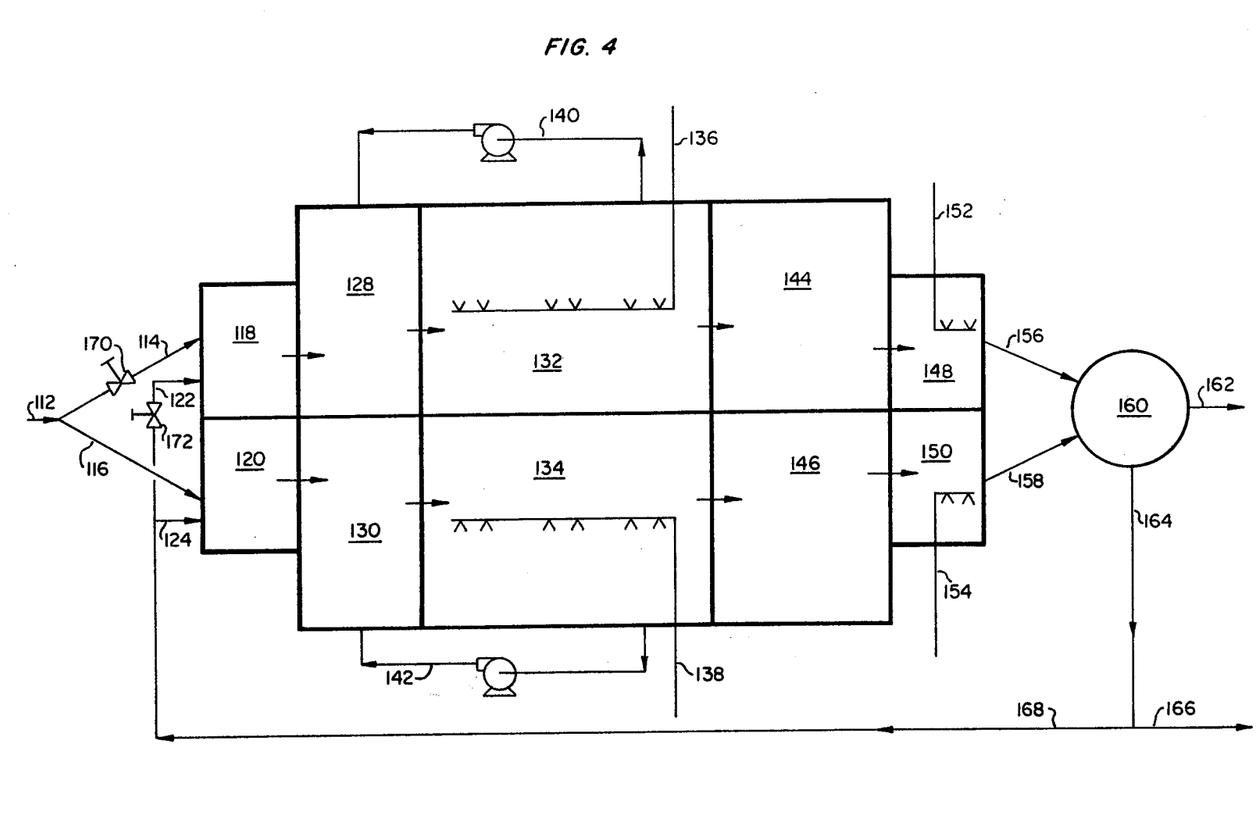
FIG. 4 is a simplified plan view illustrating an installed plant embodying a process of the type described in U.S. Pat. No. 4,056,465 and the corrective action which can be taken to gain the advantages of the present improvement.

In FIG. 4 there is shown a schematic plan view representing a hypothetical installed wastewater treating plant composed of two trains which are mirror images of each other.

In this figure there is illustrated a wastewater influent line 112 which is split into lines 114 and 116, each of which provides wastewater influent to the first treating zones 118 and 120, respectively, of the parallel trains. Also shown in FIG. 4 are sludge inlet lines 122 and 124 which introduce activated sludge into treating zones 118 and 120, respectively.

Treating zones 118 and 120 are maintained under anaerobic conditions and it is in these zones that the initial contacting between influent and sludge is effected in order to produce mixed liquor.

Subsequent to the anaerobic treatment in zones 118 and 120 the anaerobically treated mixed liquor is then passed to anoxic treatment zones 128 and 130, respectively. This is represented by the arrows indicating flow from zones 118 and 120 into zones 128 and 130, respectively. (Flow from zone to zone elsewhere in this Figure is also represented by arrows.) In zones 128 and 130 the mixed liquor is subjected to anoxic treatment whereby denitrification is effected and $NO_x^-$ is converted to nitrogen gas, which is then vented from the system.

Thereafter the mixed liquor from zones 128 and 130 is passed to oxic treating zones 132 and 134, respectively. In this figure oxygen inlet manifolds 136 and 138 are illustrated as a means for introducing oxygen-containing gas into oxic treating zones 132 and 134, respectively. In oxic treating zones 132 and 134 BOD is oxydized, phosphate in the liquid portion of the mixed liquor are taken up by the biomass and ammonical nitrogen compounds are nitrified to form nitrites and nitrates ($NO_x^-$).

Also shown in this figure are mixed liquor internal recycle lines 140 and 142 which operate to transport $NO_x^-$-containing mixed liquor from oxic treating zones 132 and 134, respectively, to anoxic treating zones 128 and 130, respectively. As mentioned previously, the $NO_x^-$ compounds in the mixed liquor are converted to elemental nitrogen gas in the anoxic treating zones.

The mixed liquor form oxic treating zones 132 and 134 is then passed to second anoxic treating zones 144 and 146, respectively. The treatment in these second anoxic zones is effective to further convert $NO_x^-$ to elemental nitrogen gas which is then removed from the system.

Finally the mixed liquor from second anoxic zones 144 and 146 is passed to second oxic zones 148 and 150, respectively, wherein the mixd liquor is subjected to a second oxic treatment. Oxygen inlet lines 152 and 154 are illustrated as introducing oxygen-containing gas to second oxic treating zones 148 and 150, respectively. One of the purposes of this final oxic treatment is to raise the DO level of the mixed liquor to a high level before it is passed from oxic treating zones 148 and 150 by means of lines 156 and 158, respectively, to clarifier 160. This high DO level tends to keep the separated sludge from going anaerobic which would permit phosphorus bleed-out from the biomass.

Clarifier 160 operates by permitting the separation of the mixed liquor into a more dense active biomass phase and a supernatent liquid phase, which liquid phase is removed from clarifier 160 by means of line 162. The more dense activated biomass is removed from clarifier 160 by means of line 164. A portion of the separated biomass is removed from the system by means of line 166, while another portion of the activated biomass is recycled to the initial anaerobic treating zone by means of line 168 which in turn connects with lines 122 and 124, described previously.

A not untypical wastewater treating plant of the type described above and illustrated in FIG. 4 would have an IDT for all of the treating zones in the range of about 16 to 20 hours. Further the distribution of such total IDT, on a percentage basis, for the various treating zones illustrated would be about as follows:

Anaerobic treatment (zones 118, 120)—8 to 10%
First anoxic treatment (zones 128, 130)—from about 15 to about 20%
First oxic treatment (zones 132, 134)—35 to 45%
Second anoxic treatment (zones 144, 146)—25 to 30%
Final oxic treatment (zones 148, 150)—8 to 10%.

A system of this type having a protracted IDT would undoubtedly have a comparatively low F/M ratio relative to the particular BOD/P ratio existing in the influent. In accordance with the present improvement, the proposed method of controlling F/M and BOD/P ratios is simply to install valves 170 and 172 in lines 114 and 122, respectively. To effect the change all that need be done is to reduce the rate at which activated sludge is being recycled via line 168 to a level of 50% of its former value while simultaneously closing valves 170 and 172. This is effective to divert the entire flow of influent wastewater in line 112 through line 116 and into the initial anaerobic treating zone 120 while diverting the now 50% reduced flow of recycle activated sludge from line 168 through line 124 and into anaerobic treating zone 120. In effect, the entire parallel train composed of zones 118, 128, 132, 144 and 148 and line 156 is shut down and removed from the process system. Such procedure would leave unchanged the BOD/P ratio while substantially doubling the F/M ratio and result in a total IDT for the process system in the range from about 8 to 10 hours.

In order to illustrate this invention in greater detail, reference is made to the following examples in which wastewater from a variety of municipalities was tested.

EXAMPLES 1-11

A series of experiments was conducted employing as influents samples of municipal wastewaters. In Examples 1 through 11, total $BOD_5$ of the influents varied from about 30 to about 155 milligrams per liter (mg/l) with the soluble $BOD_5$ of the influents varying from about 9 to about 40 mg/l. The phosphorous content of the influents also varied from about 1.5 to about 9 mg/l. In Examples 1 through 8, a process of the type illustrated in FIG. 1 was employd, while in Examples 9 through 11 a nitrification-denitrification operation of the type illustrated in FIG. 2 was employed. The recycling of mixed liquor from the oxic zone to the anoxic zone in the FIG. 2 type operation is referred to as internal recycle. Various data and operating parameters of Examples 1 through 11 are set forth in the following Table I.

The methodology for determining the first order rate constant, $k_1$, is illustrated by using data relating to the operation designated as Example 6. The average profile of phosphate concentration in the oxic treating zone over a period of two weeks is shown below:

| Time, Minutes | Phosphate conc., mg P/l. |
|---|---|
| 25 ($=t_1$) | 18.7 ($=P_1$) |
| 30 | 15.0 |
| 40 | 8.0 |
| 50 | 5.4 |
| 60 | 3.7 |
| 75 | 1.7 |
| 90 ($=t_2$) | 0.8 ($=P_2$) |

The average VSS concentration for the period was 2.6 g/l. The value of the rate constant, $k_1$, was calculated as follows:

$$k_1 = (\frac{1}{VSS})(-\frac{d[\ln P]}{dt})$$
$$= (\frac{1}{VSS})(\frac{\ln P_1 - \ln P_2}{t_2 - t_1})$$
$$= (\frac{1}{2.6})(\frac{2.93 + 0.223}{1.083})$$
$$= 1.12$$

rous content of the influent, the value of $k_1$ was less than 0.5.

In Examples 2 through 11, the BOD/P ratio maintained was in the low range from about 5:1 up to about 10:1 and the F/M ratios varied within the defined limits. Examples 2 and 3, derived from different municipal wastewaters, illustrate that while the BOD/P ratios were within the limits required by the invention, the F/M ratios were just below the low end of the required envelope and the rate of removal of phosphorous was not consistently above the minimum level represented by a $k_1$, value greater than 0.5.

Examples 4 through 8 illustrate other experimental runs operating with similar BOD/P ratios but with increasing F/M ratios. Again, it is interesting to note that the highest value for $k_1$ of these five examples was achieved in Example 5, the one with the shortest detention time. (This excludes the results of anomalous Example 3.)

Examples 9 through 11 illustrate an operation of the type illustrated in FIG. 2 where the ammonia content of the influent was subjected to nitrification in an oxic zone and denitrification in an anoxic zone. The internal recycle rates for these three examples approached 200%. It will be noted that in Example 9 the F/M ratio was outside the range defined by the present invention and the $k_1$ value was substantially below the required 0.5 level. On the other hand, however, in Examples 10 and 11, wherein BOD/P and F/M ratios within the defined ranges were employed, the values for $k_1$ were relatively high.

EXAMPLES 12-20

Another series of experiments was conducted employing as the influent to each experiment a sample of a municipal wastewater. In Examples 12 through 20, total $BOD_5$ of the several influents varied from about 40 to about 170 mg/l with the soluble $BOD_5$ varying from about 30 to about 100. The phosphorus content of the several influents also varied from about 1 to about 5.5

TABLE I

| Ex Nr | BOD/P | F/M | Total Influent Detention Time (hrs) | Sludge Recycle(%) | Internal Recycle(%) | $k_1$ | IDT % Anaerobic | % Anoxic | % Oxic |
|---|---|---|---|---|---|---|---|---|---|
| 1 | 4.4 | 0.2 | 2.04 | 29.2 | 0 | 0.451 | 31 | 0 | 69 |
| 2 | 7.6 | 0.062 | 3.93 | 30.4 | 0 | 0.391 | 25 | 0 | 75 |
| 3 | 8.2 | 0.061 | 2.32 | 29.3 | 0 | 1.71 | 38 | 0 | 62 |
| 4 | 9.6 | 0.13 | 2.05 | 29.7 | 0 | 0.773 | 25 | 0 | 75 |
| 5 | 8.7 | 0.16 | 1.60 | 29.8 | 0 | 1.62 | 34 | 0 | 66 |
| 6 | 8.7 | 0.24 | 2.25 | 50.0 | 0 | 1.12 | 28 | 0 | 72 |
| 7 | 8.4 | 0.33 | 2.08 | 30.1 | 0 | 0.852 | 31 | 0 | 69 |
| 8 | 8.7 | 0.55 | 2.05 | 29.3 | 0 | 0.657 | 31 | 0 | 69 |
| 9 | 6.4 | 0.053 | 1.90 | 30.0 | 199 | 0.164 | 39 | 16 | 45 |
| 10 | 5.8 | 0.10 | 1.90 | 30.0 | 197 | 0.558 | 39 | 16 | 45 |
| 11 | 9.8 | 0.14 | 2.49 | 30.0 | 194 | 1.34 | 37 | 14 | 49 |

Referring now to the data in Table I, Example 1 illustrates operation employing a BOD/P ratio outside the scope of this invention, i.e. less than about 5, even though the F/M ratio was well into the acceptable range. Although this particular operation did result in substantial reduction in the BOD content and phosphomg/l. In Examples 12 through 17, a process of the type illustrated in FIG. 1 was employed, while in Examples 18 through 20, a nitrification-denitrification operation of the type illustrated in FIG. 2 was employed. Various data and operating parameters for Examples 12 through 20 are set forth in the following Table II.

TABLE II

| Ex Nr | BOD/P | F/M | Total Influent Detention Time (hrs) | Sludge Recycle(%) | Internal Recycle(%) | $k_1$ | IDT | | |
|---|---|---|---|---|---|---|---|---|---|
| | | | | | | | % Anaerobic | % Anoxic | % Oxic |
| 12 | 12 | 0.085 | 4.08 | 26 | 0 | 0.43 | 23 | 0 | 77 |
| 13 | 13.4 | 0.08 | 2.4 | 30 | 0 | 1.8 | 23 | 0 | 77 |
| 14 | 20 | 0.16 | 4 | 18 | 0 | 1.58 | 23 | 0 | 77 |
| 15 | 14.5 | 0.29 | 1.58 | 25.4 | 0 | 1.78 | 32 | 0 | 68 |
| 16 | 18 | 0.41 | 2.1 | 20 | 0 | 1.5 | 23 | 0 | 77 |
| 17 | 15.1 | 0.67 | 1.33 | 30.3 | 0 | 1.55 | 32 | 0 | 68 |
| 18 | 13.8 | 0.058 | 2.23 | 30 | 184 | 0.282 | 31 | 18 | 51 |
| 19 | 11.4 | 0.11 | 2.25 | 30 | 101 | 0.82 | 29 | 16 | 55 |
| 20 | 16.4 | 0.19 | 2.94 | 31 | 201 | 2.38 | 54 | 11 | 35 |

Generally the data in Table II illustrates operations employing a BOD/P ratio in the range from about 10:1 up to about 20:1. Examples 12 and 13, employing different municipal wastewaters, illustrate that while the BOD/P ratios were within the limits required by the invention, the F/M ratios were just below the low end of the required envelope and the rate of removal of phosphorus was not consistently above the minimum level represented by a $k_1$, value greater than 0.5. Examples 14 through 17 illustrate other experimental runs operating with similar BOD/P ratios but with increasing F/M ratios. Again, it will be seen that in many instances the result of decreasing detention time is to increase the value of the $k_1$ factor.

Examples 18 through 20 exemplify an operation of the type illustrated in FIG. 2 where the ammonia in the influent was subjected to nitrification in an oxic zone and denitrification in an anoxic zone. The internal recycle rates for these three examples varied from about 100 to about 200 percent. In Example 18 it will be seen that the value of the F/M ratio fell below the minimum acceptable level of 0.09 and that the value of $k_1$ also fell below the minimum standard of 0.5. When operating within the scope of this invention, as illustrated by Examples 19 and 20, the $k_1$ factor was substantially greater and above the minimum acceptable level.

EXAMPLES 21–25

A further series of experiments was conducted employing a variety of BOD- and phosphorus containing influents. In these examples the total $BOD_5$ varied from about 140 to about 380 mg/l with the soluble $BOD_5$ varying from about 85 to about 155 mg/l. The phosphorus content of the influents also varied from about 4 to about 7 mg/l. In Examples 21 through 24 a process of the type illustrated in FIG. 1 was employed, while in Example 25 a nitrification-denitrification operation of the type illustrated in FIG. 2 was employed. The data and operating parameters for Examples 21 through 25 are set forth in Table III below.

TABLE III

| Ex Nr | BOD/P | F/M | Total Influent Detention Time (hrs) | Sludge Recycle(%) | Internal Recycle(%) | $k_1$ | IDT | | |
|---|---|---|---|---|---|---|---|---|---|
| | | | | | | | % Anaerobic | % Anoxic | % Oxic |
| 21 | 22 | 0.10 | 4 | 24 | 0 | 1.56 | 23 | 0 | 77 |
| 22 | 20 | 0.16 | 4 | 18 | 0 | 1.58 | 23 | 0 | 77 |
| 23 | 24.9 | 0.27 | 2.85 | 30 | 0 | 1.82 | 37 | 0 | 63 |
| 24 | 22 | 0.45 | 2.25 | 50 | 0 | 1.32 | 28 | 0 | 72 |
| 25 | 28.2 | 0.25 | 3.64 | 32 | 198 | 2.35 | 46 | 15 | 39 |

It will be seen that the examples shown in Table III operated at a BOD/P ratio in the broad range of about 20:1 up to about 50:1, but generally at a level of less than about 30:1.

Review of this data in Table III indicates the operability of the improvement of this invention when operating within the BOD/P and F/M ratios required by the invention in order to provide a $k_1$ factor having a value greater than 0.5.

What is claimed is:

1. In an activated biomass process which inhibits the proliferation of filamentous biomass and effects the storage of phosphates in the biomass by first mixing recycled activated biomass with a phosphate- and BOD-containing influent to form a mixed liquor having both liquid and solid components and initially treating the mixed liquor under anaerobic conditions such as to be substantially free of oxygen and oxidizing agents and to contain a concentration of less than about 0.7 ppm dissolved oxygen; thereby effecting selective production of nonfilamentous microorganisms capable of sorbing BOD under both anaerobic and oxidizing conditions and capable of accumulating phsophates under oxidizing conditions; subjecting the anaerobically treated mixed liquor to a subsequent oxygenating treatment by contact with oxygen-containing gas admitted to said treatment under oxic conditions such as to have maintained in the treatment a dissolved oxygen content of at least about 1 ppm to oxidize BOD in the mixed liquor to cause further removal of BOD from the liquid component and to cause accumulation of phosphates in the solid biomass component; subsequently separating the oxically treated mixed liquor into supernatant liquid and biomass; and returning a portion of the separated biomass to an initial anaerobic treatment to provide the activated biomass admixed therein with the influent; the improvement which comprises maintaning within the process system encompassing the initial anaerobic treatment and extending through the process up to, but not including, the separating step and including any internal recycle streams, a $BOD_5$ to phosphorous (BOD/P) ratio from about 5:1 up to about 50:1, wherein $BOD_5$ is expressed as milligrams of soluble $BOD_5$, exclusive of BOD attributable to ammonia, per liter of influent and P is soluble phosphate expressed as milligrams of elemental phosphorous per liter of influent, and a food to biomass (F/M) ratio from about 0.09 up to an upper limit of about 1.4 wherein F is the total weight of soluble $BOD_5$ introduced into the process per 24 hour day, and M is the weight of volatile suspended solids in the process system.

2. The process of claim 1 wherein the F/M ratio is at least about 0.1.

3. The process of claim 1 wherein the F/M ratio is less than about 1.0.

4. The process of claim 1 wherein the BOD/P ratio is from about 5:1 up to about 10:1 and the F/M ratio is less than about 0.6.

5. The process of claim 4 wherein the F/M ratio is less than about 0.3.

6. The process of claim 1 wherein the BOD/P ratio is from about 10:1 to about 20:1 and the F/M ratio is less than about 1.0.

7. The process of claim 6 wherein the F/M ratio is less than about 0.45.

8. The process of claim 1 wherein the BOD/P ratio is from about 20:1 to about 50:1 and the F/M ratio is less than about 1.4.

9. The process of claim 8 wherein the F/M ratio is less than about 0.5.

10. The process of claim 1 wherein the influent further contains ammonia values which are oxidized to nitrates and/or nitrites in an oxic treatment and wherein the mixed liquor initially treated under anaerobic conditions is further treated under anoxic conditions; the anoxic conditions including being substantially free of oxygen and oxidizing agents and having a dissolved oxygen content of less than about 0.7 ppm and wherein nitrates and/or nitrites are introduced to the anoxic treatment by transfer to said treatment of mixed liquor from an oxic treatment, said oxygenated mixed liquor having a concentration of nitrites and/or nitrates in excess of 2 ppm, expressed as elemental nitrogen, and the nitrites and/or nitrates being reduced in the anoxic treatment to elemental nitrogen gas.

11. The process of claim 10 wherein the F/M ratio is at least about 0.10 but is less than about 0.75.

12. The process of claim 10 wherein the BOD/P ratio is from about 5:1 up to about 10:1 and the F/M ratio is less than about 0.3.

13. The process of claim 10 wherein the BOD/P ratio is from about 10:1 up to about 20:1 and the F/M ratio is less than about 0.45.

14. The process of claim 10 wherein the BOD/P ratio is from about 20:1 up to about 50:1 and the F/M ratio is less than about 0.5.

15. The process of claim 1 wherein the F/M ratio and the BOD/P ratio are maintained within the recited limits by controlling at least one of the amount of BOD introduced into the system, the amount of phosphorous introduced into the system and the recycle rate of activated biomass.

16. The process of claim 1 wherein the BOD/P ratio is controlled by chemically reducing the phosphorous in the system.

17. The process of claim 1 which is a fermentation process in which a desired material is contained in the supernatant liquid and the supernatant liquid is recovered as product.

18. The process of claim 1 wherein the F/M ratio is controlled in an existing treating system by eliminating from the process system a portion of the volume of an existing treating basin.

19. The improvement of claim 1 which further includes controlling the Influent Detention Time (IDT) of the anaerobic treatment and of the oxic treatment such that the IDT of the anaerobic treatment is from about 5% to about 80% of the total IDT of the process system, and the IDT of the oxic treatment is from about 95% to about 20% of the total IDT of the process system.

20. The improvement of claim 19 wherein the IDT of the anaerobic treatment is from about 10% to about 70% of the total IDT and the IDT of the oxic treatment is from about 90% to about 30% of the total IDT.

21. The improvement of claim 19 wherein the IDT of the anaerobic treatment is from about 20% to about 60% of the total IDT and the IDT of the oxic treatment is from about 80% to about 40% of the total IDT.

22. The improvement of claim 10 which further includes controlling the IDT of the anaerobic treatment, of the oxic treatment and of the anoxic treatment such that the IDT of the anaerobic treatment is from about 5% to about 80% of the total IDT of the process system, the IDT of the oxic treatment is from about 20% to about 95% of the total IDT of the process system and the IDT of the anoxic treatment is from about 5% to about 50% of the total IDT of the process sytem.

23. The improvement of claim 22 wherein the IDT of the anoxic treatment is from about 5% to about 30% of the total IDT of the process system.

24. The improvement of claim 22 wherein the IDT of the anoxic treatment is from about 10% to about 20% of the total IDT of the process system.

25. The improvement of claim 1 which further includes controlling the IDT of the anaerobic and oxic treatments such that, of the total IDT of the anaerobic and oxic treatments, the IDT of the anaerobic treatment is from about 10% to about 70% of such total IDT and the IDT of oxic treatment is from about 90% to about 30% of such total.

26. The improvement of claim 25 wherein the IDT of the anaerobic treatment is from about 10% to about 60% of such total IDT and the IDT of the oxic treatment is from about 90% to about 40% of such total.

* * * * *

UNITED STATES PATENT AND TRADEMARK OFFICE
CERTIFICATE OF CORRECTION

PATENT NO. : 4,271,026
DATED : June 2, 1981
INVENTOR(S) : Michael S. Chen et al

It is certified that error appears in the above-identified patent and that said Letters Patent are hereby corrected as shown below:

Column 15-16, Table II
   Under Ex Nr 18, starting with column "Internal Recycle(%)" number should read 184, number under "$k_1$" should read 0.282, under "% Anaerobic" number should read 31, under "% Anoxic" number should read 18, under "% Oxic" number should read 51.

Column 16, Line 27
   delete "phosphate-" and substitute therefor -- phosphates --

Signed and Sealed this

Tenth Day of August 1982

[SEAL]

Attest:

GERALD J. MOSSINGHOFF

Attesting Officer

Commissioner of Patents and Trademarks